July 3, 1956     A. GREB ET AL     2,753,175
ADJUSTABLE WORK TABLE
Filed Jan. 19, 1955     2 Sheets-Sheet 1
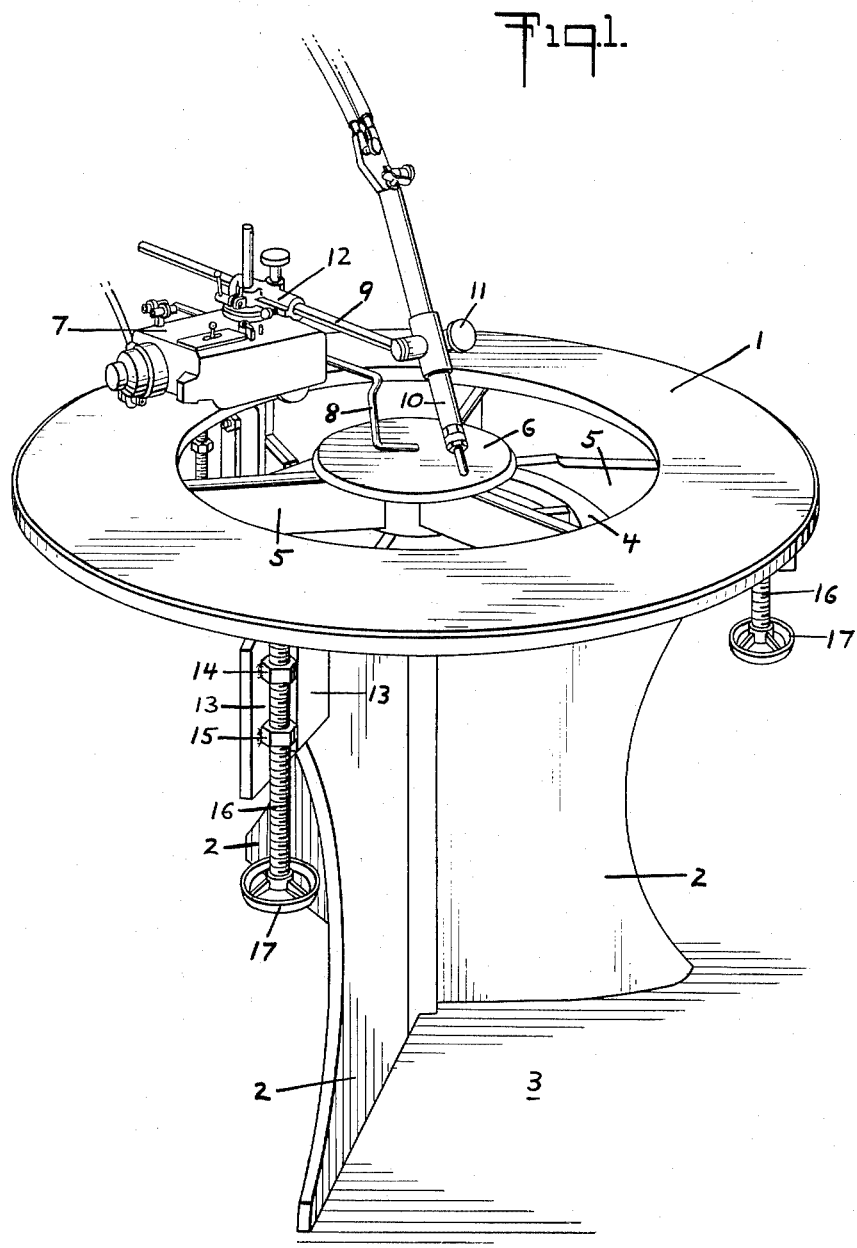
INVENTORS:
Arthur Greb
Harold E. Tyler
BY George Sipkin
Lee P. Huntzberger
ATTORNEYS:

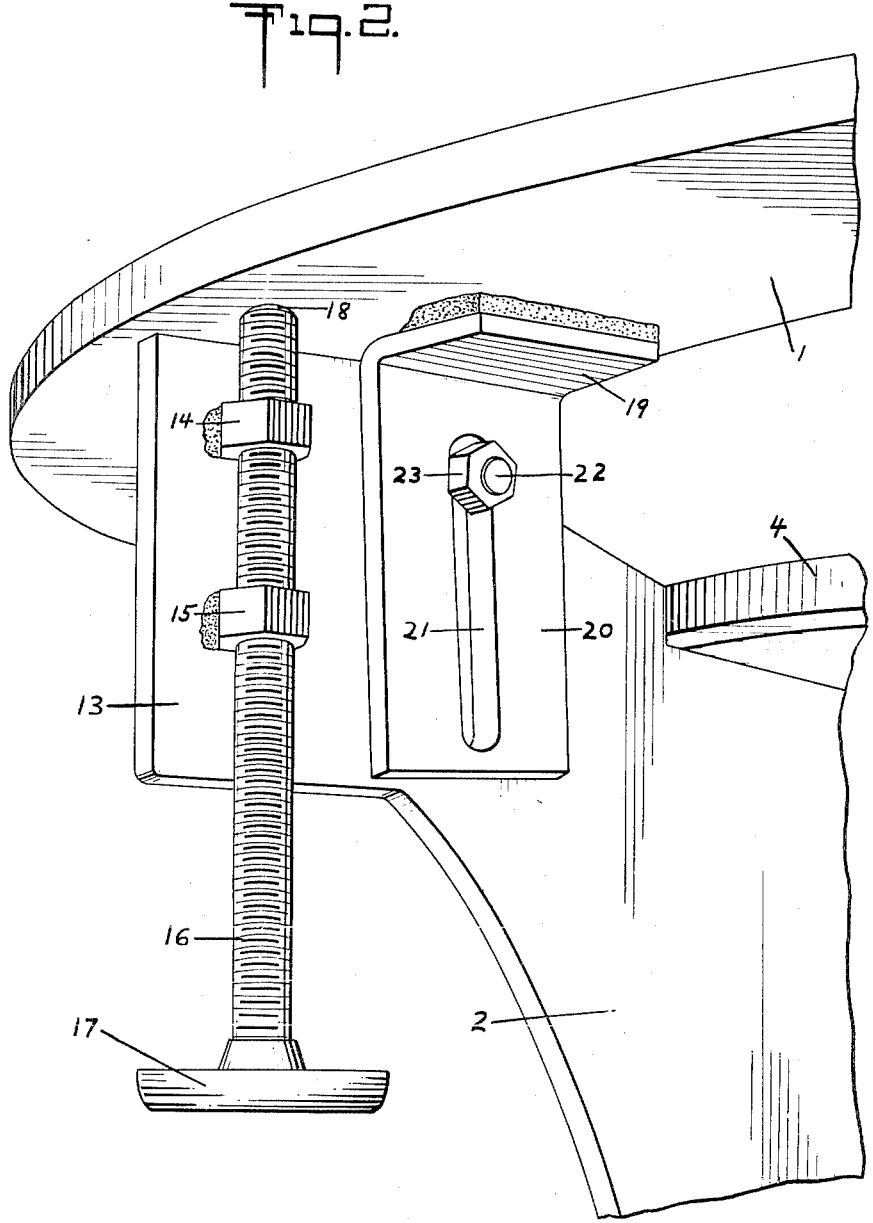

ns the carriage 7 from tipping towards the radial center of the table 1, during its motion about said table. Clamping brackets (not shown in Fig. 1) may be affixed to the underside of the carriage 7 in such positions and adapted to cooperate with said table 1 in such a manner that they guide said carriage tangentially along the table 1 while simultaneously holding said carriage to said table. Such clamping brackets prevent the tipping of the carriage 7 in either direction, towards or away from the radial center of the table 1, during its motion.

United States Patent Office 2,753,175
Patented July 3, 1956

2,753,175

ADJUSTABLE WORK TABLE

Arthur Greb, Corona, and Harold E. Tyler, New York, N. Y., assignors to the United States of America as represented by the Secretary of the Navy Application January 19, 1955, Serial No. 482,909

10 Claims. (Cl. 266—23)

(Granted under Title 35, U. S. Code (1952), sec. 266)

The invention described herein may be manufactured and used by or for the Government of the United States of America for governmental purposes without the payment of any royalties thereon or therefor.

This invention concerns adjustable work tables of the type that support and guide cutting tools in relation to material to be cut.

The cutting operations may be performed on metal or other material by abrasive tools or by burning tools.

Work tables of the prior art have an adjustable center which supports and raises or lowers material to be cut. When the material is thus centrally supported, the table center supporting and positioning mechanism, such as a threaded bar, becomes fouled with the residue of the cutting operation. When the material is cut by abrasive action, particles of material clog the supporting and positioning mechanism or threads. When the material is cut by burning action, material slag clogs the supporting and positioning mechanism, or threads.

The principal object of the present invention is the provision of an improved adjustable work table.

An object of this invention is the provision of an improved adjustable work table of high operating efficiency.

An object of this invention is the provision of an adjustable work table which eliminates fouling of the position adjusting mechanism.

An object of this invention is the provision of an adjustable work table which supports a cutting tool in adjustable position and supports material to be cut in fixed position.

Another object of the present invention is the provision of an adjustable work table which is capable of accommodating material of relatively great weight and of relatively enlarged surface area.

Other objects and many of the attendant advantges of this invention will be readily appreciated as the same becomes better understood by reference to the following detailed description when considered in connection with the accompanying drawings wherein:

Fig. 1 is a perspective presentation of the improved adjustable work table of the present invention; and Fig. 2 is a perspective presentation of the position adjusting mechanism of the improved adjustable work table of the present invention.

The tool supporting table 1 of annular configuration rests on the supporting legs 2 which are securely affixed to a surface 3. An annular member 4 is mounted on the supporting legs 2 in grooves cut across the tops of said legs. A plurality of radially positioned arms 5 are securely affixed to the annular member 4. A removable center plate 6 rests on the radially positioned arms 5 at the radial center of the tool supporting table 1. The center plate 6 supports any material desired to be cut.

An electrically driven carriage 7 is supported on the table 1 in such a manner that it is free to move tangentially on said table about the radial center of said table. For instance, the carriage 7 may ride on wheels in a track on the surface of the table 1. The riding rod 8 pre- The tool supporting rod 9 is carried by the carriage 7 and carries the cutting tool 10. The cutting tool 10 may be of the abrasive type or of the burning type; its height above the material to be cut, which rests on the center plate 6, is secondarily adjusted by moving it through the adjustable tool clamp 11 on the tool supporting rod 9 and tightening it in a desired position. The radial position of the cutting tool 10 is adjusted by moving the tool supporting rod 9 in the adjustable rod clamp 12 and tightening it in a desired position.

An extension arm 13 is securely affixed to the upper portion of each of the supporting legs 2. Threaded nuts 14 and 15 are firmly affixed at one of their side faces to each of the extension arms 13 in vertical alignment. A threaded bar 16 is threaded through the nuts 14 and 15 in such a manner that it may be moved vertically by turning. A handwheel 17 is affixed to the lower end of the threaded bar 16 to facilitate its vertical motion by turning.

The adjustable work table of the present invention operates to position the cutting tool 10 in a desired relation to the material to be cut which rests upon the center plate 6. The cutting tool 10 is tightened in a desired position on the tool supporting arm 9, which is tightened in a desired position on the carriage 7. The introduction of various thicknesses of material to the work table for cutting is made possible by the vertical adjustment of the tool supporting table 1. The handwheels 17 are turned until the tool supporting table 1 is at a height above the material supporting center plate 6 sufficient to accommodate the material desired to be cut. The cutting operation, by abrasion or by burning, is initiated after the tool supporting table 1 is secured in position by the means shown in Fig. 2. The carriage 7 is energized to carry the cutting tool 10 around the tool supporting table 1.

Fig. 2 is a perspective presentation of the position adjusting mechanism of the improved adjustable work table of the present invention.

The tool supporting table 1 is raised or lowered by the threaded bars 16, one of which is shown in Fig. 2. The threaded bar 16 is threaded in the nuts 14 and 15 which are affixed to the extension arm 13 of the supporting leg 2. The annular member 4 supports the center plate 6 (shown in Fig. 1).

Vertical motion of the threaded bar 16 is facilitated by the handwheel 17 affixed to its lower end. The upper end 18 of the threaded bar 16 is bevelled to provide a smooth abutting end.

The horizontal member 19 of an L-type bracket is securely affixed to the underside of the tool supporting table 1. The vertical member 20 of the L-type bracket has a vertical slot 21 cut through it. A stud 22 is firmly affixed at one end to the supporting leg 2 and extends at its other end through the bracket slot 21. A lock nut 23 is threaded on the extending portion of the stud 22.

In operation, the procedure described in conjunction with Fig. 1 is followed. After the tool supporting table 1 is positioned as desired, through manipulation of the handwheels 17, said table may be locked in position by the tightening of the lock nuts 23. This is predicated by the free sliding of the L-type bracket with the tool supporting table 1. Of course, the lock nuts 23 must be loosened before the tool supporting table 1 may be repositioned.

In a preferred embodiment of this invention, three supporting legs 2 are utilized; each supporting leg 2 mounts a threaded bar 16 and locking bracket in the manner disclosed.

Obviously many modifications and variations of the present invention are possible in the light of the above teachings. It is therefore to be understood that within the scope of the appended claims the invention may be practiced otherwise than as specifically described.

We claim:

1. An adjustable work table adapted to position a cutting tool in relation to material desired to be cut comprising a center plate adapted to support said material, a plurality of radially positioned arms supporting said center plate at their radial center, an annular member supporting said radially positioned arms, a plurality of substantially vertical supporting legs supporting said annular member in a substantially horizontal position, an extension arm affixed to the upper portion of each of said plurality of supporting legs, a pair of threaded nuts affixed at a side face to each of said extension arms positioned in substantially vertical alignment, a threaded bar threaded in each said pair of threaded nuts adapted for substantially vertical movement, a tool supporting table supported by said threaded bars in a substantially horizontal position, said tool supporting table being of annular configuration having an inner diameter greater than the diameter of said center plate and being positioned coaxially with said center plate, each said threaded bar having an abutting upper end adapted to contact the under surface of said tool supporting table and a handwheel affixed to its lower end, an L-type bracket having its horizontal member affixed to the under surface of said tool supporting table and its vertical member slidably mounted in a substantially vertical direction on each of said extension arms adjacent each said pair of threaded nuts, means for locking each said L-type bracket to the extension arm on which it is slidably mounted, a carriage supported for substantially tangential motion on said tool supporting table, said carriage being power driven, means for providing substantially tangential motion of said carriage on the over surface of said tool supporting table, means for balancing said carriage in motion on said tool supporting table, an adjustable rod clamp affixed to said carriage, a tool supporting rod supported in adjustable substantially horizontal radial position by said clamp, an adjustable tool clamp affixed to one end of said tool supporting rod adapted to adjustably support said cutting tool in proximity to said center plate.

2. The adjustable work table described in claim 1 in which said cutting tool is a burning torch.

3. An adjustable work table adapted to position a cutting tool in relation to material desired to be cut comprising a center plate adapted to support said material, a plurality of substantially vertical supporting legs adapted to support said center plate, an extension arm affixed to the upper portion of each of said plurality of supporting legs, a pair of threaded nuts affixed at a side face to each of said extension arms positioned in substantially vertical alignment, a threaded bar threaded in each said pair of threaded nuts adapted for substantially vertical movement, a tool supporting table supported by said threaded bars in a substantially horizontal position, said tool supporting table being of annular configuration having an inner diameter greater than the diameter of said center plate and being positioned coaxially with said center plate, each said threaded bar having an abutting upper end adapted to contact the under surface of said tool supporting table and a handwheel affixed to its lower end, means affixed to the under surface of said tool supporting table adapted for substantially vertical sliding motion on each of said extension arms adjacent each said pair of threaded nuts, means for locking each said sliding means to the extension arm on which it is slidably mounted, carriage means supported for substantially tangential motion on said tool supporting table, said carriage means being power driven, means for providing substantially tangential motion of said carriage means on the over surface of said tool supporting table and means for adjustably supporting said cutting tool in proximity to said center plate.

4. The adjustable work table described in claim 3 in which said cutting tool is a burning torch.

5. An adjustable work table adapted to position a cutting tool in relation to material desired to be cut comprising a center plate adapted to support said material, means for supporting said center plate in substantially horizontal position, an extension arm affixed to the upper portion of each unit of said supporting means, inside threaded receptacle means affixed to each of said extension arms in substantially vertical alignment, a threaded bar threaded in each said receptacle means adapted for substantially vertical movement, a tool supporting table supported by said threaded bars in a substantially horizontal position, said tool supporting table being of annular configuration having an inner diameter greater than the diameter of said center plate and being positioned coaxially with said center plate, a handwheel affixed to the lower end of each said threaded bar, means for locking said tool supporting table in position at any desired position of said threaded bars, means for adjustably supporting said cutting tool in proximity to said center plate and means cooperating with the over surface of said tool supporting table for imparting substantially tangential motion to said adjustable tool supporting means.

6. The adjustable work table described in claim 5 wherein said cutting tool is a burning torch.

7. An adjustable work table adapted to position a cutting tool in relation to material desired to be cut comprising means for supporting said material in substantially horizontal position, a tool supporting table of annular configuration, means for adjustably supporting said tool supporting table in selected substantially horizontal positions coaxially with said material, said adjustable table supporting means comprising threaded receptacle means affixed to said material supporting means cooperating with threaded bar means threaded through said threaded receptacle means engaging the underside of said tool supporting table, means for locking said tool supporting table at any desired position, means for adjustably supporting said cutting tool in proximity to said material and means cooperating with the over surface of said tool supporting table for imparting substantially tangential motion to said adjustable tool supporting means.

8. An adjustable work table adapted to position a cutting tool in relation to material desired to be cut comprising means for supporting said material in substantially horizontal position, a tool supporting table of annular configuration, means for adjustably supporting said tool supporting table in selected substantially horizontal positions coaxially with said material, means for locking said tool supporting table at any desired position, means for adjustably supporting said cutting tool in proximity to said material and means cooperating with the over surface of said tool supporting table for imparting substantially tangential motion to said adjustable tool supporting means.

9. The adjustable work table described in claim 8 wherein said cutting tool is a burning torch.

10. An adjustable work table adapted for use in positioning a fabricating tool relative to a workpiece comprising, in combination, support means adapted to be secured to a floor and having a portion at the top thereof for supporting a workpiece in fixed position, a table top of substantially annular configuration whose inside dimension is substantially greater than the outside dimension of said portion and adapted to be disposed around the workpiece, and adjustable means engaging said first-mentioned means and the underside of said table top for positioning said table top horizontally and around the workpiece, said adjustable means adapted to secure said table top in any of a plurality of positions along a substantially vertical axis, said adjustable means being disposed outside the path of falling material removed from the workpiece during fabrication and further being shielded from falling material by said table top, said table top being adapted to support and guide a mobile tool carrying means.

References Cited in the file of this patent

UNITED STATES PATENTS

| | | |
|---|---|---|
| 1,553,769 | Godfrey | Sept. 15, 1925 |
| 1,684,128 | Edelman | Sept. 18, 1928 |